June 16, 1953        C. LAWLER        2,641,912
PLATE AND COVER THEREFOR
Filed Nov. 13, 1951
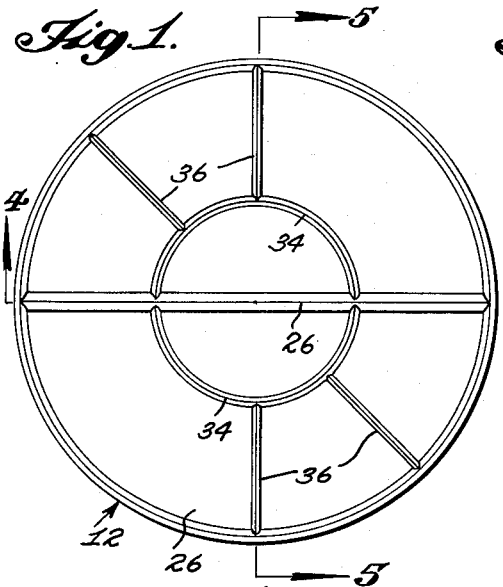
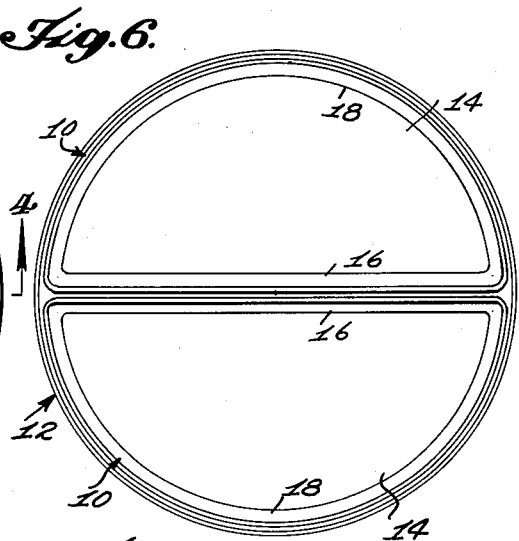
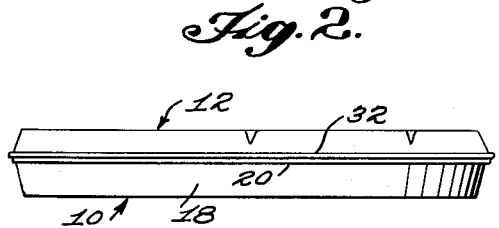
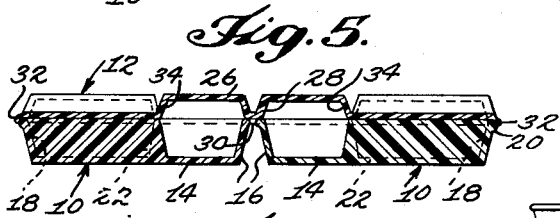
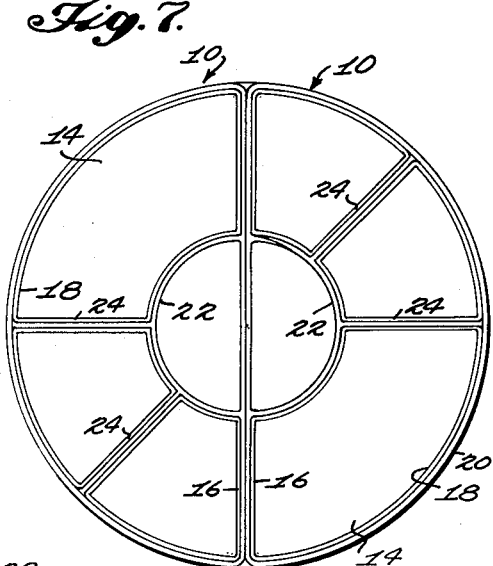
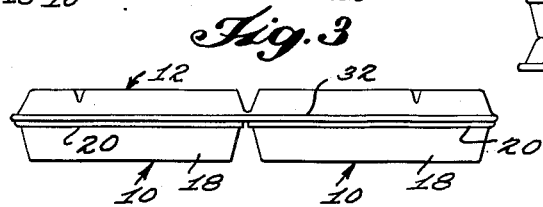
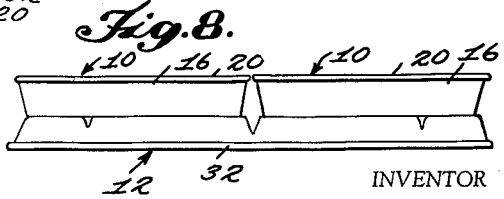
INVENTOR
CARLTON LAWLER
BY
McMorrow, Berman + Davidson
ATTORNEYS Patented June 16, 1953

2,641,912

UNITED STATES PATENT OFFICE 2,641,912

PLATE AND COVER THEREFOR

Carlton Lawler, Dallas, Tex.

Application November 13, 1951, Serial No. 256,027

4 Claims. (Cl. 65—59)

This invention relates to a plate adapted as a container for food, and to a cover for said plate.

The preparation of hot meals at a central kitchen, for distribution to locations remote from said kitchen, there to be consumed, is becoming more and more widespread in the art of food handling. The advantages of such a system can be readily perceived, in that hot meals can be distributed to a plurality of spaced points after preparation at a central location, thus to eliminate the necessity of separate, individual kitchens each of which must be equipped with a large amount of expensive equipment. For example, where a factory or other large installation can contract for the delivery of a large number of hot meals, said delivery to be effected daily at a specified time, the construction of a restaurant, cafeteria, and kitchen at the location of said factory or like installation can be dispensed with completely, at an appreciable saving.

Further, an arrangement as described permits a restaurant chain to be provided with a single kitchen, with hot meals being delivered to a number of outlets at different locations for consumption by the patrons of the chain.

Heretofore, however, difficulties have been encountered in establishing an arrangement of the type stated. For example, it has been difficult to keep the prepared meals hot up until the time they are to be consumed, and the exposure of the food to air reacts to the detriment of the appearance of the meal. Still further, it has been difficult to separate different kinds of food used to make up a single meal, upon the plate on which the food is to be consumed, it being appreciated that during transportation of the food, the different portions of the hot meal tend to run together, particularly when said portions lack the requisite solidity that would ordinarily tend to keep them from flowing.

Yet another difficulty has been experienced, in that it has been difficult to pack a large number of hot meals in a compact area.

The main object of the present invention is to provide a combined plate and cover therefor so formed as to eliminate all the difficulties set forth above, the plate and cover constituting the present invention being novelly designed to prevent intermixing of the food making up the hot meal, while at the same time being adapted for stacking of the plates one upon another in a minimum area.

Yet another important object is to provide a plate of the type stated, wherein the plate and its associated cover are so formed as to retain considerably more heat than has heretofore been the case.

Still another important object is to provide a combined plate and cover so formed as to permit a pair of identical plates to be protected by a single cover, said cover being so formed as to permit another pair of plates to be stacked thereabove.

Yet another important object is to provide a combined plate and cover wherein the cover is recessed complementarily to the plates associated therewith, thus to prevent mashing or compression of the food portions.

Still another important object is to provide a combined plate and cover so formed as to be capable of being readily molded to shape from plastic material or the like, thus to permit the manufacture thereof at a minimum of cost.

Other objects will appear from the following description, the claims appended thereto, and from the annexed drawing, in which like reference characters designate like parts throughout the several views, and wherein:

Figure 1 is a top plan view of the cover;

Figure 2 is an edge view of the plates and cover;

Figure 3 is a view similar to Figure 2, the plates and cover being viewed from a location 90 degrees away from the location at which the plates and cover of Figure 2 are viewed;

Figure 4 is a sectional view taken one line 4—4 of Figure 1;

Figure 5 is a sectional view taken on line 5—5 of Figure 1;

Figure 6 is a bottom plan view of the plates and cover;

Figure 7 is a top plan view of the plates alone; and

Figure 8 is a view similar to Figure 3 in which a cover is illustrated in supporting relation to a pair of plates disposed immediately thereabove.

At the outset, it is important to note that although I have illustrated the plates and cover of the invention as being formed from plastic material, they need not necessarily be made from this material. They can instead be formed from metal or from any other suitable material, and except as necessarily required by the claims appended hereto, it is not desired that the invention be limited to the specific material or relative dimensions illustrated in the drawing, these being merely a preferred embodiment of the invention submitted by way of example of the presently preferred construction.

In any event, a single plate and cover unit comprises a pair of identically formed, semi-circular plates 10 and a single cover generally designated 12, that overlies said pair of plates.

Referring first to the plate construction, only a single plate will be described, it being understood that the other plate of the pair is formed identically to the described plate.

The plate 10 comprises a flat bottom wall 14 which in the present instance is of semi-circular formation, as may be readily noted from Figure 6.

Integral with the bottom wall 14 and extending upwardly from the straight inside edge of the bottom wall is an inner side wall 16, that extends through the entire length of said inner edge of the bottom wall. The side wall 16, as may be particularly noted from Figure 5, is inclined upwardly and outwardly of its associated plate 10, so that the inner side walls 16 of a pair of adjacent, oppositely disposed plates can converge upwardly toward the cover 12 that overlies said pair.

Also formed integrally with the bottom wall 14, and extending through the entire length of its arcuate outer edge, is an outer side wall 18, the ends of which are joined integrally to the opposite ends of the inner wall 16.

As will be seen, the bottom wall and the inner and outer side walls cooperate to define a container for food which is relatively deep, said container being of substantially semi-circular formation in the present instance.

For the purpose of preventing the intermixing of foods deposited within the plate, I provide a plurality of compartments within said plate. In the present instance an inwardly disposed center compartment is provided, said compartment being provided by an arcuate center partition concentric with and spaced a substantial distance inwardly from the outer side wall 18. The center partition has been designated 22, and is integral with the inner side wall 16 of the plate. The center partition intersects with said inner side wall at locations spaced longitudinally of the inner side wall, and is formed to a height equal to that of the inner side wall.

Extending between the center partition 22 and the outer side wall 18 is a plurality of spaced radial dividers 24, defining a plurality of compartments. The dividers 24 can be spaced any desired distance apart, and can be of any desired number. In the present instance, a pair of such dividers is provided, said dividers being so arranged as to define two smaller compartments and one larger compartment equal in size to two of the smaller compartments and adapted to receive the main portion of the meal.

A bead 20 is formed upon the upper edges of the inner and outer side walls, said bead extending continuously through the entire periphery of the plate 10.

Referring now to the construction of the cover 12, this is provided with a flat body 26 of circular formation. The body 26 is provided with a number of depending ribs and flanges, all of which can be formed by pressing downwardly portions of the body during the molding thereof. Thus, a diametrically disposed main rib 28 is provided upon the cover 12, said rib depending from the body 26 and extending from one location upon the periphery of the body to a location diametrically opposite.

The depending main rib 28 is integrally formed (see Figure 5) with a downwardly extended tongue 30, extending throughout the full length of the main rib. The tongue 30 is adapted to extend downwardly between the beads of the contiguous inner side walls 16 of the pair of plates 10, so as to space said side walls apart when the plate and cover are packed for distribution to a desired location.

Also formed upon the body 26 is a peripheral, depending flange having an outturned bead 32 engaging over the bead 20 of the plates, thus to cooperate with the tongue 30 in sealing the plates throughout the periphery thereof. In this way, the heat given off by the foods is retained within the plates, thus keeping the foods at a desired temperature until consumption.

Also formed upon the cover 12 are depending partitions complementary to the partitions 22, 24 of the respective plates 10. To this end, an arcuate, depending partition 34 is formed upon the plate cover 12, said partition 34 being of circular formation so as to be complementary to the semi-circular partitions 22 of the respective plates 10.

Also formed upon the cover 12 are depending radial dividers 36, that are complementary to the dividers 24 of the plates 10.

Thus, when the cover 12 is applied to a pair of side-by-side plates 10, the partitions 34, 36 thereof will engage the upper edges of the partitions 22, 24 of the plates, thus to seal each compartment of each plate effectively during the transportation of the plate and cover unit. The compartments of the plates are thus sealed one from another, to assure against intermixing of foods, and also to prevent the permeation of one food portion with the odors emanating from another food portion.

It will be observed that the body 26 of the cover 12 is elevated above the top edge of the plate 10, by reason of the depending main rib 28 and the depending partitions 34, 36 of said cover. As a result, when food portions are deposited within the plates 10, they can be higher than the top edges of the plates, and will still not be mashed or compressed when the cover 12 is applied to the plates.

In this connection, it is important to note that the depending portions 34, 36 terminate at their lower edges at the plane of the top edge of each plate 10 (see Figure 5). However, the peripheral bead 32 of the cover 12, that merges into the tongue 30 is extended below the plane of the top edge of each plate, as is the tongue 30, thus to apply a sealing action to the respective plates 10 while at the same time preventing movement of the plates 10 relative to one another and to the cover 12 associated therewith. This sealing action is aided when a plurality of the plate and cover units are stacked one above another within a large container, not shown.

In use, the plates 10 would be filled automatically, in most instances, with the desired food portions, at a central kitchen, after being preheated to a desired temperature. The preheating of the plates 10 aids in the retention of the heat of the food portions, when said portions are deposited in the plates. The cover also is preheated, before application to a pair of plates 10. In this connection, it is proposed that the plate and cover units, after being filled with the desired food portions, will be packed in superposed relation within a larger, vacuum insulated food carrier which is well known to those engaged regularly in food handling, and which is well adapted for the transportation of the plate and cover units constituting the present invention.

In Figure 8, the arrangement wherein the cover of one unit supports the plates of the unit next above is illustrated. Since the cover 12 of one unit is provided with a flat body, it is well adapted to support the flat bottom walls 14 of the plates 10 next above. This arrangement wherein plates and covers alternate throughout the stack not only permits the units to be stacked in a minimum of space, but also causes the weight of the several units to be imposed upon the unit therebelow, so as to effectively seal the plates 10 throughout their peripheries.

I believe it will be readily appreciated that in the use of plate and cover units formed as illustrated and described herein, it is possible to prepare hot meals at a central kitchen, and then pack the meals in suitable, heat-retaining containers, not shown. These containers can then be distributed promptly to specified locations at specified times, for consumption of the hot meals on the premises. In this way, there is a substantial reduction in the cost of kitchen equipment, and there is at the same time an elimination of kitchen space which would otherwise be required. The arrangement, as will be seen, has value not only in the distribution of prepared food to factories or similar installations, but also is valuable to restaurants, wherein it may be desired to prepare various foods at a central location, and then transport the foods to locations elsewhere in the same general area.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

For example, considering uses to which the invention may be put, a potential use for the cover alone would be to permit it to function separately from the plate, as a relish dish.

Another use to which the plate and cover illustrated in the drawings could be put would be the serving of meals on air lines.

Still further, a potential use for the plate and cover arises, in that precooked meals may be deposited in the plate, frozen, and sold in chain stores and other establishments. In this event, the cover would be cut into two semicircular pieces, along the line 26, shown in Figure 1. By so doing, one would make a separate cover for each plate instead of one cover for two plates. It may be noted that the containers would in this event be probably made of a treated paper or other fibrous stock.

What is claimed is:

1. In a plate and cover unit having its main application to the transportation of prepared food portions to a remote location for consumption thereat, a pair of semi-circular plates arranged in side-by-side relation and proportioned to serve as receptacles for prepared food portions, each of said plates having a straight, upstanding inner side wall arranged in parallelism with the corresponding wall of the other plate, an arcuate, outer side wall rigidly joined at its ends to the inner wall, and a plurality of upstanding partitions effective to form a plurality of separate compartment in each plate; and a single, circular cover shaped to overlie both of said plates, said cover having a depending peripheral flange engaging the outer walls of the plates, a depending rib extending diametrically of the cover and engaging said inner walls, and a plurality of depending partitions complementary to and engaging the partitions of the plates, thus to form a marginal seal upon each of the plates and a seal around each compartment of each plate, the plates having flat bottom walls and the cover having a flat top wall, for support of the plates of one unit upon the cover of a like unit disposed immediately therebelow.

2. In a plate and cover unit having its main application to the transportation of prepared food portions to a remote location for consumption thereat, a pair of semi-circular plates arranged in side-by-side relation and proportioned to serve as receptacles for prepared food portions, each of said plates having a straight, upstanding inner side wall arranged in parallelism with the corresponding wall of the other plate, an arcuate, outer side wall rigidly joined at its ends to the inner wall, and a plurality of upstanding partitions effective to form a series of separate compartments in each plate; and a single, circular cover shaped to overlie both of said plates, said cover having a depending peripheral flange engaging the outer walls of the plates, a depending rib extending diametrically of the cover and engaging said inner walls, and a plurality of depending partitions complementary to and engaging the partitions of the plates, the plates having beads formed upon the upper edges of their respective side walls and the cover having an outturned peripheral flange engaging over the beads of the outer side walls of the plates, said cover being provided with a tongue depending from the rib and merging at its ends into the flange, the tongue engaging between the respective inner walls of the plates to form a marginal seal upon each of the plates and a seal around each compartment of each plate, the plates having flat bottom walls and the cover having a flat top wall for support of the plates of one unit upon the cover of a like unit disposed immediately therebelow.

3. In a plate and cover unit having its main application to the transportation of prepared food portions to a remote location for consumption thereat, a pair of semi-circular plates arranged in side-by-side relation and proportioned to serve as receptacles for prepared food portions, each of said plates having a straight, upstanding inner side wall arranged in parallelism with the corresponding wall of the other plate, an arcuate, outer side wall rigidly joined at its ends to the inner wall, and a plurality of upstanding partitions effective to form a plurality of separate compartments in each plate; and a single, circular cover shaped to overlie both of said plates, said cover having a depending peripheral flange engaging the outer walls of the plates, a depending rib extending diametrically of the cover and engaging said inner walls, and a plurality of depending partitions complementary to and engaging the partitions of the plates, thus to form a marginal seal upon each of the plates and a seal around each compartment of each plate.

4. In a plate and cover unit having its main application to the transportation of prepared food portions to a remote location for consumption thereat, a pair of semi-circular plates arranged in side-by-side relation and proportioned to serve as receptacles for prepared food portions, each of said plates having a straight, upstanding inner side wall arranged in parallelism with the corresponding wall of the other plate, an arcuate, outer side wall rigidly joined at its ends to the inner wall, and a plurality of upstanding partitions effective to form a series of separate compartments in each plate; and a single, circular cover shaped to overlie both of said plates, said cover having a depending peripheral flange engaging the outer walls of the plates, a depending rib extending diametrically of the cover and engaging said inner walls, and a plurality of depending partitions complementary to and engaging the partitions of the plates, the plates having beads formed upon the upper edges of their respective side walls and the cover having an outturned peripheral flange engaging over the beads of the outer side walls of the plates, said cover being provided with a tongue depending from the rib and merging at its ends into the flange, the tongue engaging between the respective inner walls of the plates to form a marginal seal upon each of the plates and a seal around each compartment of each plate.

CARLTON LAWLER.

References Cited in the file of this patent

UNITED STATES PATENTS

| Number | Name | Date |
|---|---|---|
| 471,517 | Barry et al. | Mar. 22, 1892 |
| 616,143 | Rose | Dec. 20, 1898 |
| 950,844 | Dolan | Mar. 1, 1910 |
| 1,336,776 | Drinkwater | Apr. 13, 1920 |
| 1,488,462 | Abram | Apr. 1, 1924 |
| 1,509,524 | Morrison | Sept. 23, 1924 |
| 1,542,115 | Weis | June 16, 1925 |
| 1,677,845 | Pinney | July 17, 1928 |

FOREIGN PATENTS

| Number | Country | Date |
|---|---|---|
| 13,965 | Great Britain | June 17, 1913 |
| 511,634 | Great Britain | Aug. 22, 1939 |
| 574,021 | France | Mar. 21, 1924 |